(No Model.) 2 Sheets—Sheet 1.
A. DURAND.
CHEMICAL FIRE EXTINGUISHER.
No. 432,482. Patented July 15, 1890.
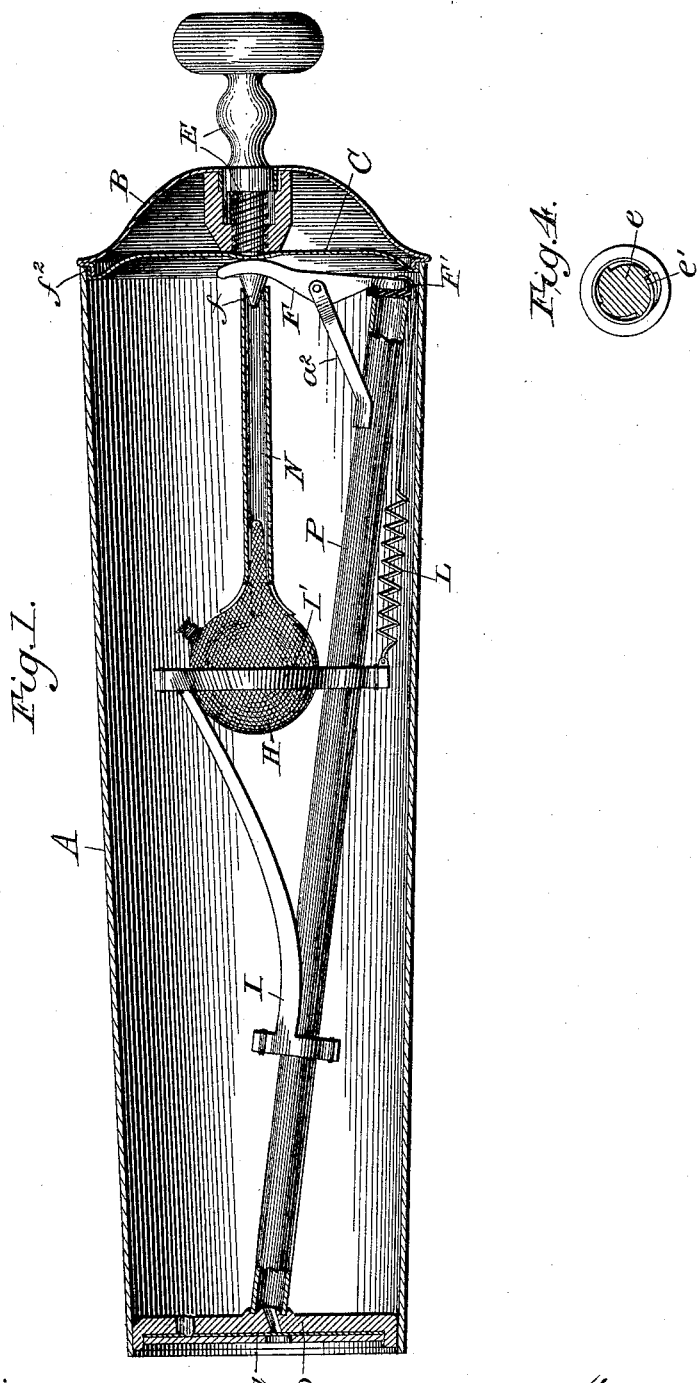
Witnesses:
Wm L Bates
Wm M Reynolds
Inventor
Arthur Durand

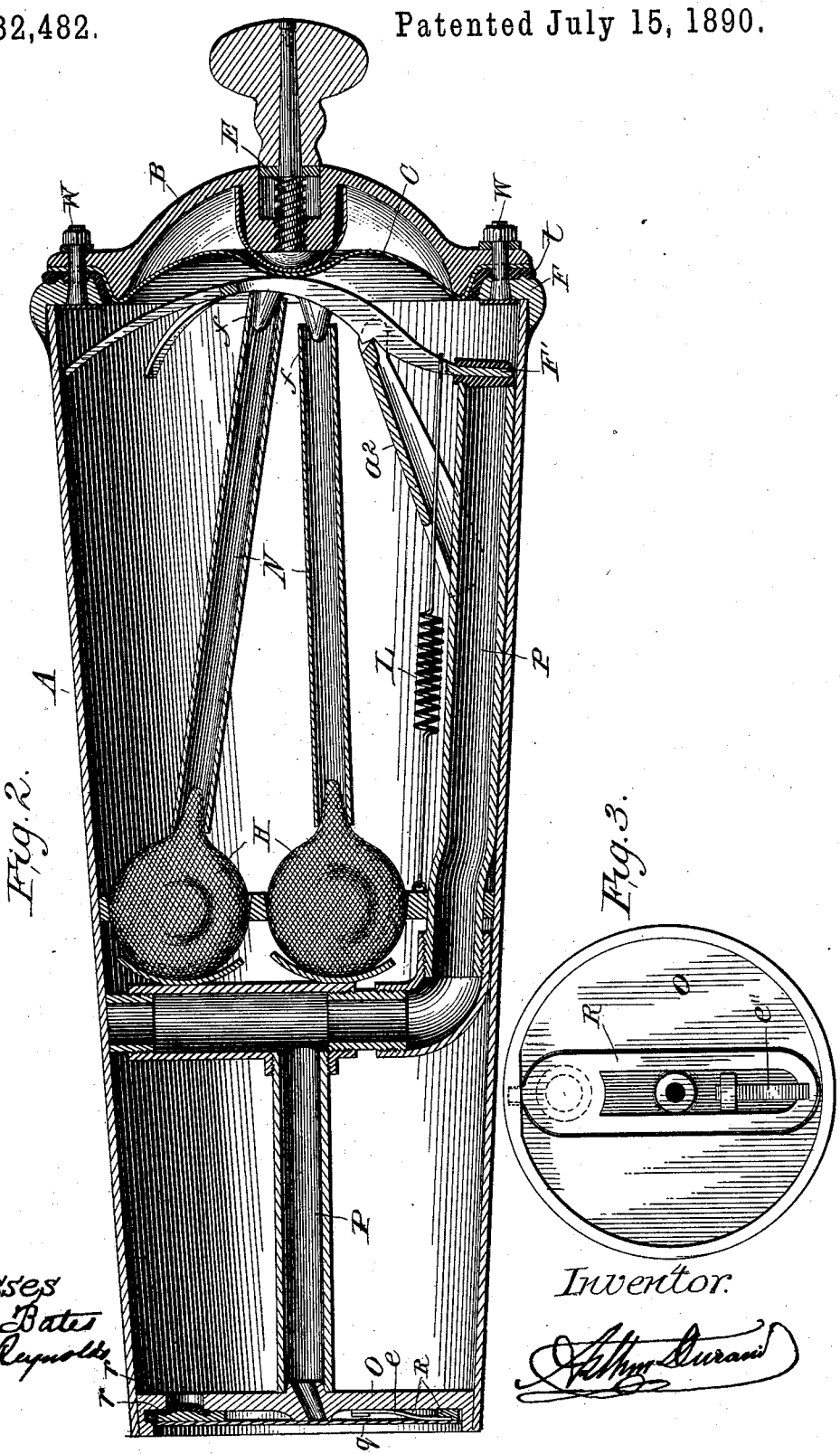

UNITED STATES PATENT OFFICE.

ARTHUR DURAND, OF WASHINGTON, DISTRICT OF COLUMBIA, ASSIGNOR TO JAMES M. TINKER, OF SAME PLACE, AND THOMAS B. EDELIN, OF BROOKLYN, NEW YORK.

CHEMICAL FIRE-EXTINGUISHER.

SPECIFICATION forming part of Letters Patent No. 432,482, dated July 15, 1890.

Application filed March 12, 1890. Serial No. 343,586. (No model.)

*To all whom it may concern:*

Be it known that I, ARTHUR DURAND, a citizen of the Republic of France, residing at Washington, District of Columbia, have invented a new and useful Improvement in Chemical Fire-Extinguishers, of which the following is a specification.

The object of this invention is to provide a chemical fire-extinguisher which will be airtight in all its details and which will present no passages through which gas or fluid can escape save through the channel provided therefor, thereby securing the best possible results from the device while in action.

It further consists in such details of construction as will be more particularly set forth in the specification and pointed out in the claims.

In the drawings which form a part of this application, Figure 1 is a longitudinal section of my improved fire-extinguisher for hand use. Fig. 2 is a longitudinal section showing a modification of the parts thereof designed for heavy work. Fig. 3 is an elevation on line $x\ x$, Fig. 1, showing the spring pawl-and-ratchet mechanism for controlling the lever-actuating screw; and Fig. 4 is a front elevation of the escape or relief valve.

Referring to the drawings, A represents the casing or cylinder, which tapers slightly toward its outer end. B is the rear or butt plate thereof, within which the screw E is located. This screw has its bearing rigidly secured to said plate, and the screw is rotatably fixed therein in any suitable manner. Surrounding this screw near the shank portion and integral therewith is a ratchet $e$, having any desired number of teeth, (four, as shown, being preferable,) and surrounding these in turn is a spring-pawl $e'$, which engages with one of the teeth of the ratchet, and this assures the rotation of the screw in but one direction.

Within the butt-plate B is located the diaphragm C. This I regard as a very important and essential feature of my invention, as will be shown later on. The diaphragm is made of metal and is rigidly secured to the inturned flange $f^2$ of the butt-plate, or it may be secured in any other suitable manner within the cylinder. It is flexible and preferably concavo-convex toward the screw, and it may have concentric corrugations thereon for giving it additional strength and elasticity, as by this means a greater degree of elasticity is obtained.

Within the cylinder, and near its lower side, is a discharge-tube P. This tube has a short inclined arm $a^2$, rigidly secured near its lower end. Upon the free end of this arm is a centrally-pivoted lever F, the upper end of which is provided with a conical stud or boss $f$. The lower end of the lever forms a valve which closes the inner end of the tube P.

Upon the tube P, at a suitable distance from its inner end, is fixed a clamping-frame I, which is in turn braced by the strut I', which is also fixed to the pipe P, though a bearing may be found for this at any other point within the cylinder. Beneath the tube P is a spiral spring L, which has one end fixed to the lower terminal of the clamping-frame I. The opposite end of this spring is connected to the valve F' and serves to keep it normally closed over the end of tube P, with which it engages.

Within the forks of the clamping-frame I is a glass bulb H, which is provided with a neck, the prolongation of which is inserted in the metallic tube N, which is suitably flared to receive it. This tube N engages with the stud $f$ on the lever F, and it is sustained in a fixed horizontal position between the bulb and the lever by the neck and boss, respectively. The outer end of the pipe P rests in a recess in a disk O, which forms the outer head of the casing or cylinder. This disk has an orifice which registers with the end of the tube P, and through this passes the fire-extinguishing compound when the device is in service. On this disk is located a discharge or relief valve R. This is in the form of a strut-spring $e''$, the one end of which is secured to the disk, the other free end being provided with a valve $r$, of rubber or other suitable material. This valve is normally seated in the orifice $r'$, and it serves to relieve the cylinder of its pressure if in handling or shipping the glass bulbs should break.

In Fig. 2 is shown a modification of the construction, which is designed for heavier work. This shows a duplication of the bulbs, bosses, and pipes connecting the same, the difference in this case being that a certain amount of pressure exerted on the lever will crush one bulb, while a greater pressure thereon through the screw will crush the other also. By this arrangement a constant and equal flow of the compound is assured from cylinders of greater capacity. The pipe P in this instance has an upwardly-curved prolongation, which serves as a brace therefor. In this view, Fig. 2, it will be observed that the diaphragm C is interposed between a collar T on the cylinder and the butt-plate, and that it is provided with suitable packing $t$, and that all the parts are united by bolts and nuts W. The bulbs H are incased in suitable foraminous or perforated textile material. This serves to retard the flow of the chemical contained in the bulb and prevents it mingling too rapidly with that which is contained in the cylinder, and thereby secures a uniform pressure and discharge. It also prevents broken pieces of the bulb clogging the working part of the device.

Any of the well-known chemical agents may be employed to form a compound for use in this machine.

The operation is very simple. A slight pressure exerted on the screw E will force it forward against the diaphragm. This in turn will bear against the lever F, carrying forward the boss or stud $f$, and with it the tube N. This crushes the bulb, and upon its collapse the contained liquid is free to mingle with that in the cylinder. As the upper end of the lever moves forward, the lower or valve end is thrown back and a ready passage for the compound is found in the pipe P. A cover of paper or other suitable material is placed over the relief-valve mechanism, as is shown at $q$. This serves to conceal that part of the mechanism and yet leaves the "overflow" contained in the cylinder to find a ready exit.

Various changes and modifications will suggest themselves which will not be a departure from the spirit of my invention. These I have not deemed necessary to illustrate or describe.

Having thus described my invention, what I deem to be new, and desire to secure by Letters Patent, is—

1. A chemical fire-extinguisher cylinder having a butt-plate, a flexible diaphragm within the cylinder and contiguous to said butt-plate, a frangible bulb and its crushing mechanism located in advance of the diaphragm, and mechanism for actuating the diaphragm and through it the bulb-crushing mechanism.

2. A chemical fire-extinguisher cylinder having a butt-plate, a concavo-convex diaphragm located in advance of the same, a frangible bulb and its crushing mechanism supported in advance of the diaphragm, and mechanism in the rear of the diaphragm and located in the butt-plate for actuating the diaphragm and through it the bulb-crushing mechanism.

3. A chemical fire-extinguisher cylinder having a flexible diaphragm therein and means from without engaging the same to actuate it and thereby crush a frangible bulb located in advance of said diaphragm.

4. A chemical fire-extinguisher cylinder having a butt or rear plate, a diaphragm within the same in advance of the butt-plate, a screw operating through said plate and against said diaphragm, a bulb supported in advance of said diaphragm, and a lever pivoted within the cylinder and engaging the bulb with one of its arms, the opposite arm thereof being provided with a valve, which is normally seated in the escape-pipe.

5. In combination with a chemical fire-extinguisher cylinder having a butt-plate, a flexible diaphragm, and suitable bulb-crushing mechanism therein, an escape-pipe having an arm secured to its inner end, a centrally-pivoted lever on said arm, said lever having a valve at one end for engaging the inner end of the escape-pipe, and a stud or boss at its opposite end.

6. In a chemical fire-extinguisher, the combination of a cylinder having a butt-plate, a screw rotatively fixed therein, a flexible diaphragm within the cylinder, and with which the screw engages, an escape-pipe within said cylinder, an arm secured to the inner end of said pipe, a lever centrally pivoted thereto, one end of said lever being provided with a valve for closing the inner end of the escape-pipe, its opposite end being provided with a boss or projection which enters and supports the tube, the opposite end of said tube supporting the neck of the bulb, and whereby said bulb is crushed, and a spring for holding the valve in the escape-pipe normally closed.

ARTHUR DURAND.

Witnesses:
WM. H. BATES,
WM. M. REYNOLDS.